United States Patent
Valente

(10) Patent No.: US 10,670,128 B2
(45) Date of Patent: Jun. 2, 2020

(54) ALL-WHEEL DRIVE DRIVELINE WITH FRONT LIMITED SLIP DIFFERENTIAL

(71) Applicant: American Axle & Manufacturing, Inc., Detroit, MI (US)

(72) Inventor: Paul J. Valente, Berkley, MI (US)

(73) Assignee: American Axle & Manufacturing, Inc., Detroit, MI (US)

(*) Notice: Subject to any disclaimer, the term of this patent is extended or adjusted under 35 U.S.C. 154(b) by 96 days.

(21) Appl. No.: 15/597,665

(22) Filed: May 17, 2017

(65) Prior Publication Data
US 2018/0335121 A1 Nov. 22, 2018

(51) Int. Cl.
| | | |
|---|---|---|
| B60K 17/02 | (2006.01) | |
| F16H 48/22 | (2006.01) | |
| B60K 17/344 | (2006.01) | |
| F16D 13/52 | (2006.01) | |
| B60K 17/16 | (2006.01) | |
| F16H 48/11 | (2012.01) | |
| F16H 48/10 | (2012.01) | |
| B60K 5/04 | (2006.01) | |
| B60K 23/08 | (2006.01) | |

(52) U.S. Cl.
CPC ............ *F16H 48/22* (2013.01); *B60K 17/02* (2013.01); *B60K 17/165* (2013.01); *B60K 17/20* (2013.01); *B60K 17/344* (2013.01); *F16D 13/52* (2013.01); *B60K 5/04* (2013.01); *B60K 23/08* (2013.01); *B60K 2023/0833* (2013.01); *B60Y 2400/424* (2013.01); *B60Y 2400/73* (2013.01); *F16H 48/11* (2013.01); *F16H 2048/108* (2013.01)

(58) Field of Classification Search
CPC .......... F16H 48/22; F16H 1/145; F16H 48/08; F16H 48/11; B60K 17/02; B60K 17/344; F16D 13/52
USPC ........................................................ 180/249
See application file for complete search history.

(56) References Cited

U.S. PATENT DOCUMENTS

| | | | |
|---|---|---|---|
| 7,309,301 B2 | 12/2007 | Janson et al. | |
| 8,042,642 B2* | 10/2011 | Marsh ................. | B60K 17/348 180/247 |
| 8,469,854 B1 | 6/2013 | Downs et al. | |
| 2006/0272876 A1* | 12/2006 | Ekonen ............... | B60K 23/0808 180/249 |
| 2008/0139359 A1* | 6/2008 | Sharma ................. | B60K 23/04 475/211 |

(Continued)

*Primary Examiner* — Jacob D Knutson
(74) *Attorney, Agent, or Firm* — Burris Law, PLLC

(57) ABSTRACT

An AWD system can include a differential, a PTU, and a friction clutch. A differential input can receive torque from the powertrain and rotate about a first axis. First and second differential outputs can rotate about the first axis. A third output can be drivingly coupled to the differential input and rotatable about a second axis transverse to the first axis. The clutch can include first friction members, second friction members, and an actuator. The first friction members can be coupled to the differential input for common rotation. The second friction members can be coupled to the second differential output for common rotation. The actuator can selectively engage the first friction members with the second friction members. The secondary driveline can include a second input member coupled to the third output to receive rotary power therefrom. The second driveline can distribute rotary power for driving the second set of wheels.

7 Claims, 3 Drawing Sheets

(56) References Cited

U.S. PATENT DOCUMENTS

| | | | |
|---|---|---|---|
| 2013/0190126 A1* | 7/2013 | Braford, Jr. | F16H 48/22 |
| | | | 475/231 |
| 2015/0057123 A1* | 2/2015 | Phelps | F16D 13/74 |
| | | | 475/160 |
| 2016/0082836 A1* | 3/2016 | Ekonen | B60K 17/35 |
| | | | 475/221 |
| 2017/0246953 A1* | 8/2017 | Girlando | B60K 17/344 |
| 2018/0094714 A1* | 4/2018 | Valente | B60K 17/046 |

* cited by examiner

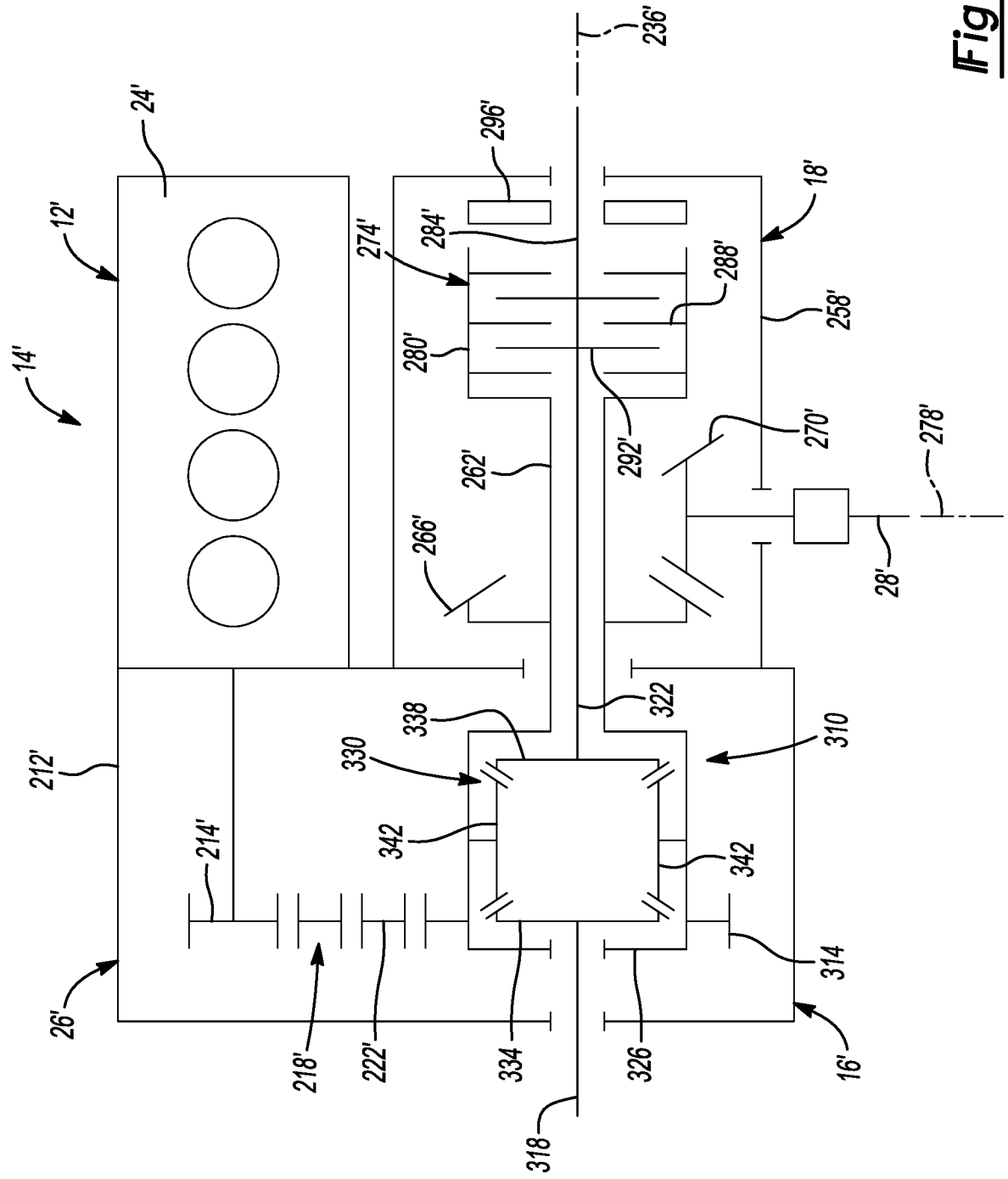

ALL-WHEEL DRIVE DRIVELINE WITH FRONT LIMITED SLIP DIFFERENTIAL

FIELD

The present disclosure relates generally to all-wheel drive vehicles and more particularly to an all-wheel drive driveline with a front limited slip differential.

BACKGROUND

This section provides background information related to the present disclosure which is not necessarily prior art.

Many modern automotive vehicles, such as crossover vehicles, are available with an all-wheel drive (AWD) drivetrain that is based on a front-wheel drive (FWD) architecture. This optional drivetrain arrangement permits drive torque to be selectively and/or automatically transferred from the powertrain to both the primary (i.e., front) driveline and the secondary (i.e., rear) driveline to provide better traction when the vehicle is operated in inclement weather and on off-highway road conditions. Such AWD vehicles necessarily are equipped with a much more complex drivetrain which, in addition to the primary driveline, must include the additional components associated with the secondary driveline such as a power take-off unit and a propshaft.

Accordingly, there remains a need in the art for development of improved all-wheel drive drivelines for use in AWD vehicles.

SUMMARY

This section provides a general summary of the disclosure, and is not a comprehensive disclosure of its full scope or all of its features.

In one form, the present disclosure provided for an all-wheel drive system for a motor vehicle. The motor vehicle can have a powertrain, a first set of wheels and a second set of wheels. The all-wheel drive system can include a primary driveline, a power take-off unit, and a secondary driveline. The primary driveline can include a differential. The differential can include a differential input member, a first output member, and a second output member. The differential input member can be adapted to receive torque from the powertrain and rotate about a first axis. The first and second output members can be rotatable about the first axis and drivingly coupled to the first set of wheels. The differential can be configured to output differential torque to the first and second output members. The power take-off unit can include a third output member, a friction clutch, and an actuator. The third output member can be rotatable about a second axis that is transverse to the first axis and can be drivingly coupled to the differential input member to receive torque therefrom. The friction clutch can include a plurality of first friction members and a plurality of second friction members. The first friction members can be coupled to the differential input member for common rotation therewith. The second friction members can be coupled to the second output member for common rotation therewith. The actuator can be configured to selectively provide an engagement force to engage the first friction members with the second friction members. The secondary driveline can include a second input member coupled to the third output member to receive rotary power therefrom. The second driveline can be adapted to distribute rotary power for driving the second set of wheels.

According to a further embodiment, the power take-off unit can include a ring gear non-rotatably coupled to the differential input member. The third output member can be a pinion gear meshingly engaged with the ring gear.

According to a further embodiment, the ring gear can be axially between the differential and the friction clutch.

According to a further embodiment, the ring gear and the pinion gear can be a hypoid gearset.

According to a further embodiment, the differential can include a differential case and a plurality of differential pinions. The differential case can be non-rotatably coupled to the differential input member. The first and second output members can be rotatably coupled to the differential case. The differential pinions can be rotatably coupled to the differential case and meshingly engaged to the first and second output members.

According to a further embodiment, the differential can include a planetary gearset.

According to a further embodiment, the planetary gearset can include a planet carrier, a set of first planet gears, a set of second planet gears, and an internal gear having teeth that face radially inward toward the first axis. The internal gear can be non-rotatably coupled to the differential input member. The planet carrier can be supported for rotation relative to the internal gear. The first and second planet gears can be rotatably coupled to the planet carrier. Each of the first planet gears can be meshingly engaged with the internal gear. Each of the second planet gears can be meshingly engaged with the first output and a corresponding one of the first planet gears. The planet carrier can be non-rotatably coupled to the second output member.

According to a further embodiment, the actuator can include a solenoid configured to axially compress the first and second friction members.

In another form, the present disclosure provided for an all-wheel drive system for a motor vehicle. The motor vehicle can have a powertrain, a first set of wheels and a second set of wheels. The all-wheel drive system can include a primary driveline, a power take-off unit, and a secondary driveline. The primary driveline can include a differential. The differential can include a first input member, a first output member, a second output member, and a differential gearset. The first input member can be adapted to receive torque from the powertrain and rotate about a first axis. The first and second output members can be rotatable about the first axis and drivingly coupled to the first set of wheels. The differential gearset can be configured to receive input torque from the first input member and to output differential torque to the first and second output members. The power take-off unit can include a ring gear, an output pinion, a friction clutch, and an actuator. The ring gear can be coupled to the first input member for common rotation about the first axis. The output pinion can be rotatable about a second axis that is transverse to the first axis. The output pinion can be meshingly engaged with the ring gear. The friction clutch can include a plurality of first friction members and a plurality of second friction members. The first friction members can be coupled to the first input member for common rotation therewith and can be axially slidable relative to the first input member. The second friction members can be coupled to the second output member for common rotation therewith and can be axially slidable relative to the second output member. The actuator can selectively provide an engagement force to axially compress the first and second friction members to transmit torque therebetween. The secondary driveline can include a second input member coupled to the output pinion to receive rotary power therefrom. The second driveline can be adapted to distribute rotary power for driving the second set of wheels.

According to a further embodiment, the differential gearset can be a planetary gearset.

According to a further embodiment, the differential gearset can be a bevel gearset.

According to a further embodiment, the actuator can include a solenoid.

Further areas of applicability will become apparent from the description and claims herein. The description and specific examples in this summary are intended for purposes of illustration only and are not intended to limit the scope of the present disclosure.

DRAWINGS

The drawings described herein are for illustrative purposes only of selected embodiments and are not intended to limit the scope of the present disclosure in any way. Similar or identical elements are given consistent reference numerals throughout the various figures.

The present disclosure will become more fully understood from the detailed description and the accompanying drawings wherein:

FIG. 3 is a schematic illustration of a portion of an all-wheel drive system of a second construction.

DETAILED DESCRIPTION

The following exemplary embodiments are provided so that the present disclosure will be thorough and fully convey the scope to those skilled in the art. Numerous specific details are set forth such as examples of specific components, devices and schematic configurations to provide a thorough understanding of exemplary embodiments of the present disclosure. However, it will be apparent to those skilled in the art that these specific details need not be employed, that the exemplary embodiments may be embodied in many different forms, and that neither should be construed to limit the scope of the present disclosure.

Figure 1:
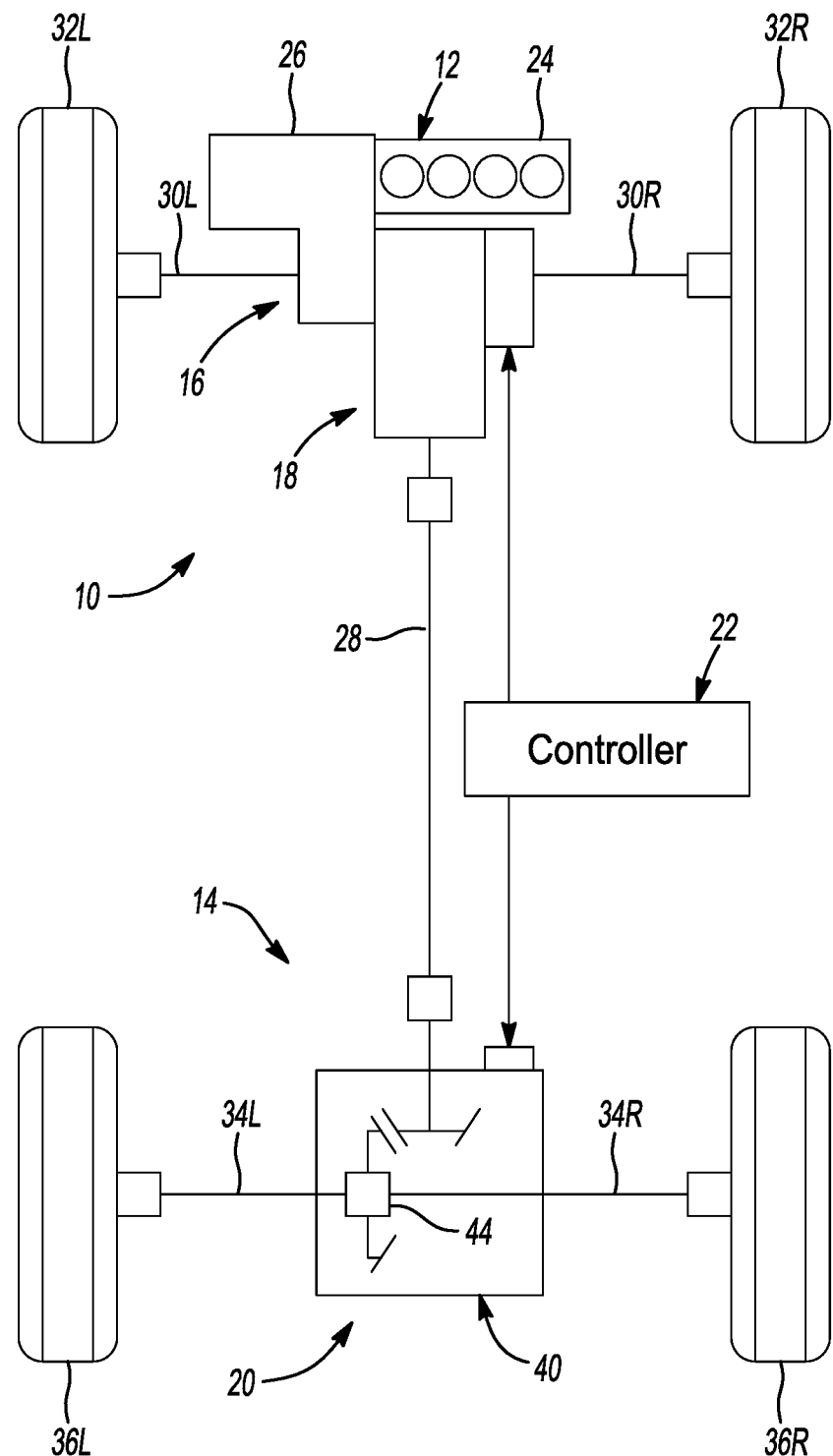
FIG. 1 is a schematic illustration of a motor vehicle equipped with an all-wheel drive system constructed in accordance with the present teachings.

With reference to FIG. 1 of the drawings, a motor vehicle constructed in accordance with the teachings of the present disclosure is schematically shown and generally indicated by reference numeral 10. The motor vehicle 10 can include a powertrain 12 and a drivetrain 14 that can include a primary driveline 16, a power take-off unit ("PTU") 18, a secondary driveline 20, and a control system 22. In accordance with various aspects of the present teachings, the primary driveline 16 can be a front driveline while the secondary driveline 20 can be a rear driveline.

The powertrain 12 can include a prime mover 24, such as an internal combustion engine or an electric motor, and a transmission 26 which can be any type of ratio-changing mechanism, such as a manual, automatic, or continuously variable transmission. The prime mover 24 is operable to provide rotary power to the primary driveline 16. The PTU 18 is described in greater detail below, but can generally be configured to receive input torque from the prime mover 24 via the transmission 26 and output torque to the secondary driveline 20 via a propshaft 28.

Figure 2:
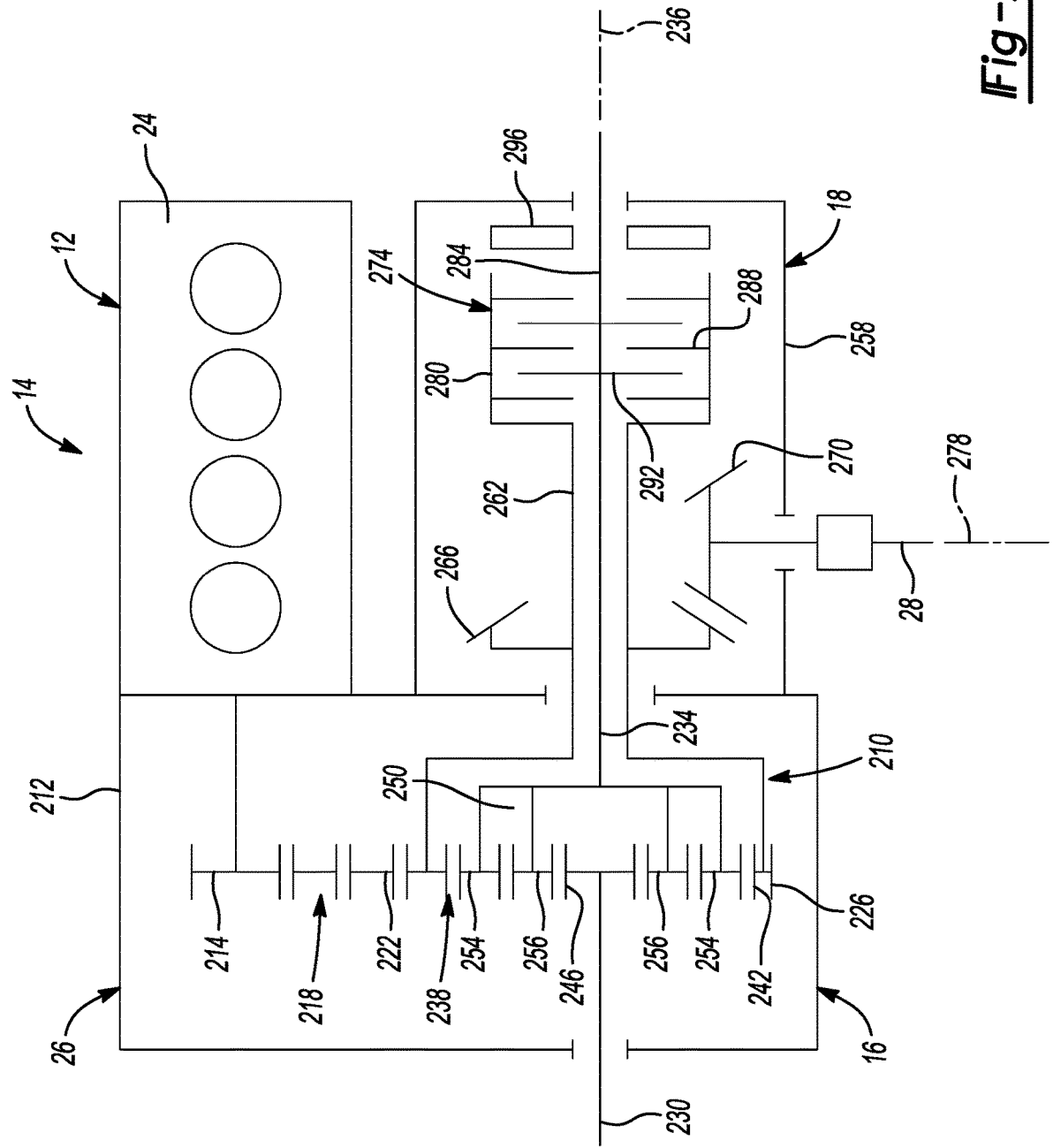
FIG. 2 is a schematic illustration of a portion of the all-wheel drive system of FIG. 1.

With continued reference to FIG. 1 and additional reference to FIG. 2, the primary driveline 16 can include a differential 210 (FIG. 2) and a pair of first axle shafts 30L, 30R, which each can be drivingly coupled to a corresponding one of a pair of first vehicle wheels 32L and 32R. In the example provided, the first vehicle wheels 32L, 32R can be front vehicle wheels.

The secondary driveline 20 can include a pair of second axle shafts 34L, 34R, a pair of second vehicle wheels 36L and 36R, and a rear drive module 40. Each second axle shaft 34L, 34R can be drivingly coupled to a corresponding one of the second vehicle wheels 36L, 36R. The rear drive module 40 can be any suitable rear drive module and can include a second differential 44 configured to receive input torque from the propshaft 28 and to output differential torque to the second axle shafts 34L, 34R. The rear drive module 40 can also include a disconnect clutch (not specifically shown) configured to interrupt rotary power transmission to the second axle shafts 34L, 34R. In the example provided, the second vehicle wheels 36L, 36R can be rear vehicle wheels.

With specific reference to FIG. 2, the transmission 26 can include a transmission housing 212, a transmission input 214, a ratio changing mechanism 218, and a transmission output 222. The transmission input 214, ratio changing mechanism 218, and transmission output 222 can be disposed within the transmission housing 212. The transmission input 214 can be drivingly coupled to the prime mover 24 to receive rotary power therefrom. While schematically shown, the ratio changing mechanism 218 can be any type of ratio-changing mechanism, such as a manual transmission, automatic transmission, or continuously variable transmission. The ratio changing mechanism 218 can be coupled to the transmission input 214 and the transmission output 222 to receive input rotary power from the transmission input 214 and to output rotary power to the transmission output 222.

The differential 210 can include a differential input member 226, a first output member 230, and a second output member 234. The differential 210 can include any suitable type of differential mechanism configured to receive input rotary power from the transmission output 222 and to output differential rotary power to the first and second output members 230, 234. In the example provided, the differential input member 226 can be rotatable about a first axis 236 and can be an external ring gear meshingly engaged with the transmission output member 222. In the example provided, the first and second output members 230, 234 can be rotatable about the first axis 236. The first output member 230 can be non-rotatably coupled to the first axle shaft 30L (FIG. 1) and the second output member 234 can be non-rotatably coupled to the other first axle shaft 30R (FIG. 1). In the example provided, the transmission 26 is a transaxle and the differential 210 is disposed within the transmission housing 212, though other configurations can be used.

In the example provided, the differential mechanism is a planetary differential mechanism including a planetary gearset 238. The planetary gearset 238 can include an internal gear 242, a sun gear 246, a planet carrier 250, and a plurality of planet gears 254 and 256. The internal gear 242 can be non-rotatably coupled to the differential input member 226 for common rotation about the first axis 236. The internal gear 242 can be an annular gear having teeth that face radially inward toward the first axis 236.

The sun gear 246 can be non-rotatably coupled to the first output member 230 for common rotation about the first axis 236. The sun gear 246 can be radially inward of the internal gear 242 and can have a plurality of teeth that face radially outward relative to the first axis 236. In the example provided, each of the planet gears 254 can be meshingly engaged with the internal gear 242 and a corresponding one of the planet gears 256, while each of the planet gears 256 can be meshingly engaged with the sun gear 246, though other configurations can be used. For example, more than two sets of planet gears could be used, or a single set of planet gears (not specifically shown) could be meshingly engaged with the internal gear 242 and the sun gear 246. Returning to the example shown in FIG. 2, the planet gears 254 and 256 can be supported by the planet carrier 250 for common rotation about the first axis 236 with the planet carrier 250, while being rotatable relative to the planet carrier 250 about the corresponding central rotational axis of each planet gear 254, 256. The planet carrier 250 can be non-rotatably coupled to the second output member 234 for common rotation about the first axis 236.

The PTU 18 can include a PTU housing 258, a tubular PTU input shaft 262, a transfer gear 266, an output pinion 270, and a friction clutch 274. The PTU input shaft 262, transfer gear 266, output pinion 270 and friction clutch 274 can be disposed within the PTU housing 258. In the example provided, the PTU input shaft 262 can extend axially into the transmission housing 212 and be non-rotatably coupled to the differential input member 226 for common rotation about the first axis 236. The PTU input shaft 262 can be disposed about the second output member 234.

The transfer gear 266 can be non-rotatably coupled to the PTU input shaft 262 for common rotation about the first axis 236. In the example provided, the transfer gear 266 can be a bevel ring gear (e.g., a hypoid ring gear), though other configurations can be used. The output pinion 270 can be supported for rotation about a second axis 278 that can be transverse (e.g., perpendicular) to the first axis 236. The output pinion 270 can be meshingly engaged with the transfer gear 266. In the example provided, the output pinion 270 and the transfer gear 266 are a hypoid gearset, though other configurations can be used. The output pinion 270 can be non-rotatably coupled to the propshaft 28 for common rotation about the second axis 278. In the example provided, the transfer gear 266 and the output pinion 270 can be disposed axially between the differential 210 and the friction clutch 274, relative to the first axis 236, though other configurations can be used.

The friction clutch 274 can include a first clutch member 280, a second clutch member 284, a plurality of first friction members or plates 288, a plurality of second friction members or plates 292, and an actuator 296. The first clutch member 280 can be non-rotatably coupled to the PTU input shaft 262 for common rotation about the first axis 236. The first friction plates 288 can be non-rotatably coupled to the first clutch member 280 for common rotation about the first axis 236, and can be axially slidable relative to the first clutch member 280.

The second clutch member 284 can be non-rotatably coupled to the second output member 234 for common rotation about the first axis 236. The second friction plates 292 can be non-rotatably coupled to the second clutch member 284 for common rotation about the first axis 236, and can be axially slidable relative to the second clutch member 284. The second friction plates 292 can be interleaved with the first friction plates 288.

The actuator 296 can be any suitable type of linear actuator configured to create a clutch engagement force to axially compress the first and second friction plates 288, 292 together such that torque is transmitted between the first and second clutch members 280, 284. The actuator 296 can be configured to selectively modulate the pressure at which the first and second friction plates 288, 292 are compressed, such that an engagement force therebetween can be modulated. Thus, the friction clutch 274 selectively couples the differential input member 226 with the second output member 234 for common rotation and can act to provide selective limited slip therebetween. In the example provided, the actuator 296 can be an annular solenoid actuator disposed about the first output member 234, though other configurations can be used. In an alternative configuration, the actuator 296 can be a hydraulic actuator including a hydraulically-operated piston (not shown) disposed within a hydraulic cylinder (not shown), such that a hydraulic pressure within the cylinder can modulate the clutch engagement force.

Thus, the actuator 296 can be operated in an open mode and an actuated mode. In the open mode, the actuator 296 can be deactivated and the first and second friction plates 288, 292 can be axially spaced apart such that the differential can operate as an open differential. In the actuated mode, the actuator 296 can be actuated such that the first and second friction plates 288, 292 can be fully engaged such that the first and second output members 230, 234 can be coupled for common rotation, limited by the frictional force between the first and second friction plates 288, 292 (i.e., the coefficient of friction between the first and second plates 288, 292, with the axial force provided by the actuator 296). The actuator 296 can be in communication with the control system 22 (FIG. 1) such that the control system 22 (FIG. 1) can control the operation of the actuator 296. The control system 22 (FIG. 1) can control the operation of the actuator 296 based on input from the driver, various vehicle characteristics, operating parameters, and/or input from one or more sensors (not specifically shown).

With additional reference to FIG. 3 a portion of a drivetrain 14' of an alternative construction is schematically illustrated. The drivetrain 14' can be similar to the drivetrain 14, except as otherwise shown or described herein. Elements of the drivetrain 14' that are similar to elements of the drivetrain 14 are denoted with similar, but primed, reference numerals. Accordingly, only the differences are described herein in detail. In the example provided, the differential 210 can be replaced with a differential 310. The differential 310 can include a differential input member 314, a first output member 318, and a second output member 322. The differential 310 can include any suitable type of differential mechanism configured to receive input rotary power from the transmission output 222' and to output differential rotary power to the first and second output members 318, 322. In the example provided, the differential input member 314 can be rotatable about the first axis 236' and can be an external ring gear meshingly engaged with the transmission output member 222'. In the example provided, the first and second output members 318, 322 can be rotatable about the first axis 236'. The first output member 318 can be non-rotatably coupled to the first axle shaft 30L (FIG. 1) and the second output member 322 can be non-rotatably coupled to the other first axle shaft 30R (FIG. 1). In the example provided, the transmission 26' is a transaxle and the differential 310 is disposed within the transmission housing 212', though other configurations can be used.

In the example provided, the differential mechanism is a bevel gear differential mechanism including a differential case 326, and a differential gearset 330. The differential gearset 330 can include a first side gear 334, a second side gear 338, and a plurality of differential pinion gears 342. The differential case 326 can be non-rotatably coupled to the differential input member 314 for common rotation about the first axis 236'. The first side gear 334 can be non-rotatably coupled to the first output member 318 for common rotation about the first axis 236'. The first side gear 334 can be disposed within the differential case 326 and supported for rotation relative to the differential case 326.

The second side gear 338 can be non-rotatably coupled to the second output member 322 for common rotation about the first axis 236'. The second side gear 338 can be disposed within the differential case 326 and supported for rotation relative to the differential case 326.

Each differential pinion gear 342 can be disposed within the differential case 326 and be coupled to the differential case 326 for common rotation about the first axis 236' while being rotatable relative to the differential case 326 about a central axis of each differential pinion gear 342. Each differential pinion gear 342 can be meshingly engaged with the first side gear 334 and the second side gear 338.

The PTU 18' can be similar to the PTU 18, except as otherwise shown or described herein. In the example provided, the PTU input shaft 262' can be non-rotatably coupled to the differential case 326 for common rotation about the first axis 236'. The second clutch member 284' can be non-rotatably coupled to the second output member 322 for common rotation about the first axis 236'. In the example provided, the transfer gear 266' and the output pinion 270' can be axially between the differential 310 and the friction clutch 274', though other configurations can be used. In the example provided, the differential 310 is disposed within the transmission housing 212', though other configurations can be used.

In an alternative configuration, not specifically shown, differential 210 (FIG. 2) or differential 310 (FIG. 3) can be disposed within the PTU housing 258.

While specific aspects have been described in the specification and illustrated in the drawings, it will be understood by those skilled in the art that various changes can be made and equivalents can be substituted for elements and components thereof without departing from the scope of the present teachings, as defined in the claims. Furthermore, the mixing and matching of features, elements, components and/or functions between various aspects of the present teachings are expressly contemplated herein so that one skilled in the art will appreciate from the present teachings that features, elements, components and/or functions of one aspect of the present teachings can be incorporated into another aspect, as appropriate, unless described otherwise above. Moreover, many modifications may be made to adapt a particular situation, configuration, or material to the present teachings without departing from the essential scope thereof. Therefore, it is intended that the present teachings not be limited to the particular aspects illustrated by the drawings and described in the specification as the best mode presently contemplated for carrying out the present teachings, but that the scope of the present teachings include many aspects and examples following within the foregoing description and the appended claims.

What is claimed is:

1. An all-wheel drive system for a motor vehicle, the all-wheel drive system comprising:
    a primary driveline including a differential, the differential including a differential input member, a first output member, and a second output member, the differential input member being rotatable about a first axis, the first and second output members being rotatable about the first axis; and
    a power take-off unit including:
        a tubular PTU input shaft having first and second axial ends, the first axial end of the tubular PTU input shaft being coupled to the differential input member for rotation therewith;
        a ring gear mounted to the tubular PTU input shaft for rotation therewith, the ring gear being disposed on the tubular PTU input shaft between the first and second axial ends;
        a PTU output member that is driven by the ring gear and which is rotatable about a second axis that is transverse to the first axis; and
        a friction clutch including a first clutch member, a second clutch member, a plurality of first friction members and a plurality of second friction members, the first clutch member being coupled to second axial end of the tubular PTU input member for rotation therewith, the second clutch member being coupled to the second output member for rotation therewith, the first friction members being coupled to the first clutch member for common rotation therewith, the second friction members being interleaved with the first friction members and coupled to the second clutch member for rotation therewith;
    wherein the PTU output member is disposed along the first axis between the differential and the friction clutch.

2. The all-wheel drive system of claim 1, wherein the PTU output member is a pinion gear meshingly engaged with the ring gear.

3. The all-wheel drive system of claim 2, wherein the ring gear and the pinion gear are a hypoid gearset.

4. The all-wheel drive system of claim 1, wherein the differential includes a differential case and a plurality of differential pinions, the differential case being non-rotatably coupled to the differential input member, the first and second output members being rotatably coupled to the differential case, the differential pinions being rotatably coupled to the differential case and meshingly engaged to the first and second output members.

5. The all-wheel drive system of claim 1, wherein the differential includes a planetary gearset.

6. The all-wheel drive system of claim 5, wherein the planetary gearset includes a planet carrier, a set of first planet gears, a set of second planet gears, and an internal gear having teeth that face radially inward toward the first axis, the internal gear being non-rotatably coupled to the differential input member, the planet carrier being supported for rotation relative to the internal gear, the first and second planet gears being rotatably coupled to the planet carrier, each of the first planet gears being meshingly engaged with the internal gear, each of the second planet gears being meshingly engaged with the first output member and a corresponding one of the first planet gears, the planet carrier being non-rotatably coupled to the second output member.

7. The all-wheel drive system of claim 1, wherein the power take-off unit includes an actuator, the actuator having a solenoid configured to axially compress the first and second friction members.

* * * * *

UNITED STATES PATENT AND TRADEMARK OFFICE
CERTIFICATE OF CORRECTION

PATENT NO. : 10,670,128 B2
APPLICATION NO. : 15/597665
DATED : June 2, 2020
INVENTOR(S) : Paul J. Valente Page 1 of 1

It is certified that error appears in the above-identified patent and that said Letters Patent is hereby corrected as shown below:

In the Claims

Column 8, Line 24 of Claim 1, before "rotation", delete "common" therefor.

Signed and Sealed this
Fourteenth Day of July, 2020

Andrei Iancu
*Director of the United States Patent and Trademark Office*